(12) United States Patent
Roudot

(10) Patent No.: US 7,380,207 B2
(45) Date of Patent: May 27, 2008

(54) METHOD AND SYSTEM FOR COMPOSING AN EDITION MODEL OR LAYOUT

(75) Inventor: Denis Roudot, Strasbourg (FR)

(73) Assignee: Andromaque Prepresse, Strasbourg (FR)

( * ) Notice: Subject to any disclaimer, the term of this patent is extended or adjusted under 35 U.S.C. 154(b) by 388 days.

(21) Appl. No.: 10/689,726

(22) Filed: Oct. 22, 2003

(65) Prior Publication Data
US 2004/0216043 A1 Oct. 28, 2004

(30) Foreign Application Priority Data
Oct. 22, 2002 (FR) .................................. 02 13142

(51) Int. Cl.
*G06F 15/00* (2006.01)
*G06F 17/00* (2006.01)
(52) U.S. Cl. ........................................ 715/243; 715/255
(58) Field of Classification Search ................ 715/517, 715/530, 255, 243
See application file for complete search history.

(56) References Cited
U.S. PATENT DOCUMENTS

| 5,761,655 | A * | 6/1998 | Hoffman | 707/4 |
| 6,928,610 | B2 * | 8/2005 | Brintzenhofe et al. | 715/517 |
| 7,009,723 | B1 * | 3/2006 | Bartholet et al. | 358/1.15 |
| 2002/0129058 | A1 * | 9/2002 | Story et al. | 707/513 |
| 2003/0023626 | A1 * | 1/2003 | Bretti | 707/506 |
| 2003/0120578 | A1 * | 6/2003 | Newman | 705/36 |
| 2004/0066408 | A1 * | 4/2004 | Meyers et al. | 345/764 |
| 2005/0038810 | A1 * | 2/2005 | Brodersen et al. | 707/102 |
| 2006/0095448 | A1 * | 5/2006 | Fitzpatrick et al. | 707/100 |
| 2006/0265496 | A1 * | 11/2006 | Freitag | 709/224 |

OTHER PUBLICATIONS

Adobe Creative Team, Graphically Rich Book: Adobe® Photoshop® 7.0 Classroom in a Book®, Publisher: Adobe Press, Pub Date: Jun. 25, 2002, pp. 131, 137-139, 223, 226, 227, 351, 448, 449, 458, 476, 513, and 514.*

* cited by examiner

*Primary Examiner*—Doug Hutton
*Assistant Examiner*—N Hillery
(74) *Attorney, Agent, or Firm*—Young & Thompson

(57) ABSTRACT

A process for the construction of an edition layout comprised by at least one sheet in which is displayed at least one visual element, information relating to the layout being stored in a database in the identified fields interconnected by connections, a visual representation according to the reality of at least one portion of the edition layout being adapted to be displayed by at least one visualization device. At least one display of a visual representation is provided in the form of a dynamic and interactive display permitting a modification by an intervener or user of the visual representation of the layout or a portion of the layout, and an automatic control between the visualization device (9, 10) and the database (8) is provided.

9 Claims, 2 Drawing Sheets

METHOD AND SYSTEM FOR COMPOSING AN EDITION MODEL OR LAYOUT

BACKGROUND OF THE INVENTION

The present invention relates to a process for the construction of a layout of an edition comprised by at least one sheet of which there is at least one element, as well as a system for practicing this process.

This invention relates to the field of editing and finds particular application in ensuring the production of a layout on the basis of which is produced the printing of a document, particularly a catalog, an advertising tract or the like.

There are already known processes permitting the production of such a layout and using, for its practice, powerful and sophisticated computer means using specific software such as, for example, that known under the designation "X-Press".

Such means do indeed permit a certain flexibility in the process of production of a layout, but their use however has numerous drawbacks.

Thus, when it is desired to modify the layout, it is often necessary to go back to the start of the design of this layout. Moreover, such a modification is usually made by applying a copy and paste type method which has the drawback of multiplying the risk of errors.

It will also be noted that the sheet of a layout usually comprises elements which, for better understanding, are arranged hierarchically and to which is given a number permitting, for example a user, to refer to commentaries or to supplemental indications concerning this element and relating, particularly in this sheet, for example to another element.

In a similar case, when proceeding to the deletion of an element, it is indispensable to modify correspondingly the hierarchy, the numbering of the other elements as well as if desired the commentaries/indications relative to this element. Such a modification must be carried out manually and is tedious and a source of error, because of the multiplication of the modifications to be carried out, essentially because of the absence of connections between the different elements.

Such an absence of connections between two elements (for example the reproduction of an object, on the one hand, and its price on the other hand) results in that a modification of the size and/or arrangement of an element (particularly its reproduction) systematically requires a supplemental intervention consisting of modifying the other element.

Moreover, there could be noted that when a sheet is produced, it is indispensable to provide sufficient space to ensure the visualization of an element, particularly constituted by a photograph. Also, and so as to ensure visualization of this element under conditions satisfactory for an observer, it is necessary to adapt the size of this element relative to the space provided, which consists in a first manipulation. Moreover, and when it is desired to modify the size of the element and/or the space, it is indispensable to proceed to at least one new manipulation consisting of modifying this element or this space.

According to another drawback, the prior art does not visualize a modification given to an element on a sheet, which generates uncertainty and can be the origin of prejudicial misunderstandings as to the good progress of the design of the layout. Moreover, this absence of visualization of a modification leads, for a person making a decision, to difficulties whether to validate a modification.

Moreover, the modifications caused by an operator on a sheet are accessible after a more or less great delay but never in real time, such that the response time to the other interveners to such a modification as well as the duration of design of a layout will be substantially extended.

The present invention has for its object to overcome at least certain of the drawbacks mentioned above, by providing a new process for the construction of the layout of an edition, as well as a system for its practice.

SUMMARY OF THE INVENTION

To this end, the present invention relates to a process for the construction of a layout of an edition, comprised by at least one sheet on which there is at least one visible element, the information relative to the structure, arrangement and/or content of said layout being stored in a database in the identified fields connected to each other by connections, this information comprising information concerning the content of said visual elements, stored in a first assembly of fields, and information concerning the arrangement of the presentation of said visual elements and the structure of the sheets and/or the layout itself, stored in a second assembly of fields, a visual representation according to the reality of at least one portion of said layout of the edition being adapted to be displayed by means of at least one visualization means, which process is characterized in that it consists in providing said at least one display of a visual representation in the form of a dynamic and interactive display permitting a modification by an intervener or user of the visual representation of the layout or a part of the layout, and in that it consists in providing an automatic control between said at least one visualization means and the database such that any modification of the layout in question taking place in one or more of its visual representations, is automatically transposed to the database and that all modification of the layout in question taking place in the database is automatically displayed in said at least one visible representation.

The invention also relates to a system for practicing the mentioned process, principally constituted by a database storing information relative to the structure, arrangement and content of the layout of an edition in the identified fields interconnected by corresponding connections, and by at least one visualization means adapted to display a visible representation according to the reality of at least one portion of said edition layout comprised by at least one sheet on which is displayed at least one visible element, which system is characterized in that said at least one visualization means provides a dynamic and interactive display permitting modification by an intervener or user of the visible representation of the layout or a portion of a layout, and in that it comprises an automatic control between said at least one visualization means and the database such that all modification of the layout in question taking place in one or more of its visible representations is automatically transposed to the database and that all modifications of the layout in question taking place in the database are automatically displayed in said at least one visible representation.

BRIEF DESCRIPTION OF THE DRAWINGS

The invention will be better understood from the following description, which relates to a preferred embodiment, given by way of non-limiting example and explained with reference to the accompanying schematic drawings, in which.

DESCRIPTION OF THE PREFERRED EMBODIMENTS

The present invention relates to the field of editing and finds particular application ensuring the production of a layout on the basis of which is produced the printing of a document, particularly a catalog, an advertising tract or the like.

In fact, and in a manner known per se, such a document is generally present in the form of at least one sheet, defined by two pages (constituting the front and rear of the sheet), and comprising on at least one of these pages (front or rear of such a sheet) at least one information constituted by at least one element.

So as to carry out printing of such a document, it is first of all necessary to proceed to the construction of an edition layout 1 comprised by at least one sheet 2, 2' on which are disposed at least one element 3, 4; 3', 4'. Such a sheet 2, 2' corresponds preferably to the page of a sheet of a document such as mentioned above.

In this context in particular, but not in a limiting way, the invention relates to a process for the construction of an edition layout 1 comprised by at least one sheet on which is disposed at least one visible element 3, 4, the information relative to the structure, arrangement or content of said layout 1 being stored in a database 8 (FIG. 3) in the identified fields interconnected by connections.

Figure 1:
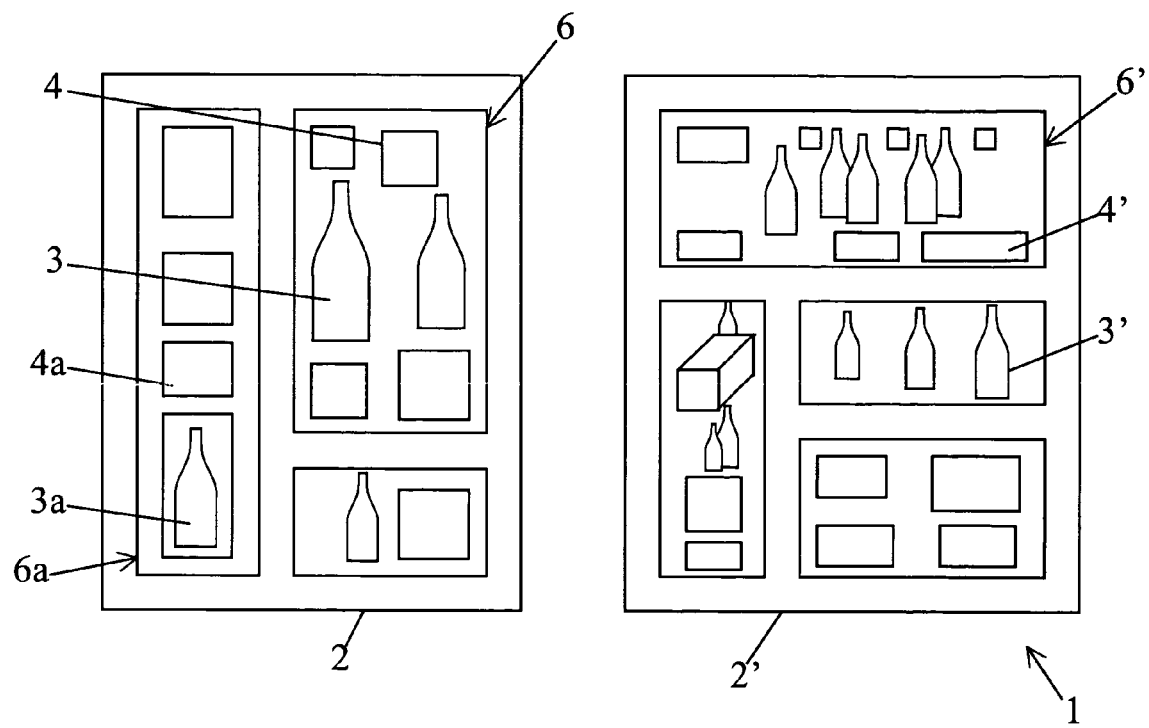
FIG. 1 is a schematic view of two sheets of the layout of an edition.
Figure 3:
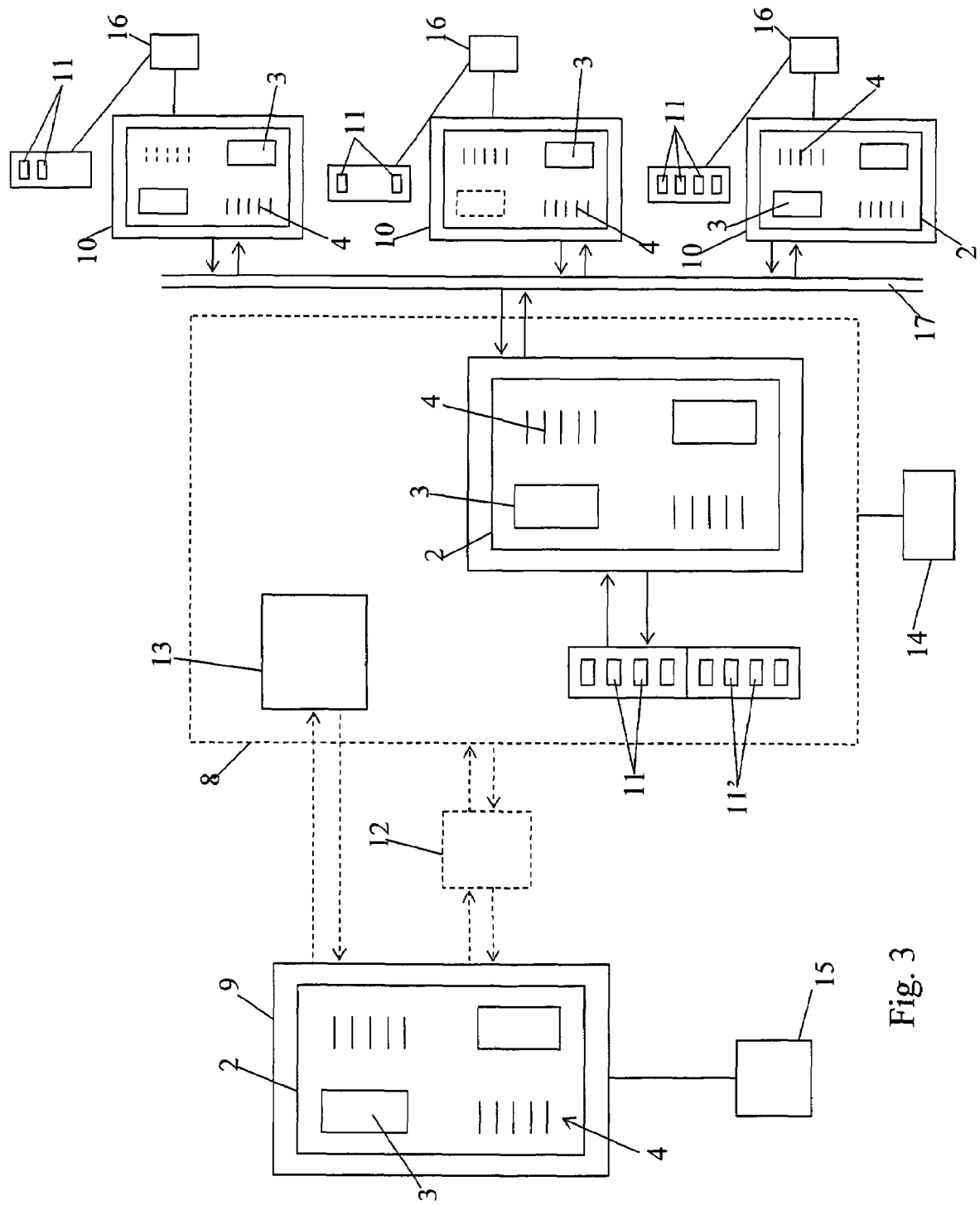
FIG. 3 is a schematic view of the principal components of a system for the practice of the process according to the invention.

The database comprises information relating to the contents of said visible elements 3, 4, stored in a first assembly of fields 11, and information concerning the form, arrangement and presentation of said visible elements and the structure of the sheets 2 and of the layout 1 itself, stored in a second assembly of fields 11', a visible representation according to reality of at least one portion of said edition layout 1 (for example several sheets 2, 2' which are sequential or not) can be displayed by means of visualization means 9, 10 (see FIGS. 1 and 3).

Stated otherwise, the database 8 encloses substantially two types of information or data, namely, on the one hand, information or data relative to the effective contents of the elements 3, 4 (fields 11) and, on the other hand, information relative to the presentation, disposition and arrangement of said contents of said elements 3, 4 in the edition layout 1 and the sheets 2 comprising this latter (field 11'), these fields 11, 11' being connected to each other structurally. Moreover, these fields are partially located in the database 8, and can be interpreted by the system and are separately manipulable.

According to the invention, said process consists in providing said at least one display of a visible representation in the form of a dynamic and interactive display permitting a modification by an intervener or user of the visible representation of the layout 1 or part of layout 1. It also consists in providing an automatic control between said at least one visualization means 9, 10 and the database 8 such that all modification of the layout 1 in question taking place in one or more of the visible representations, is automatically transposed to the database 8 and that all modification of the layout 1 in question taking place at the database 8 is automatically displayed at said at least one visible representation.

Such a modification could, as the case may be, have a single or plural elements 3, 4, one or several sheets 2 or all the layout 1 in its assembly.

In FIG. 3 are shown symbolically, in the database 8, the visible representation of a sheet 2 and its variation in terms of fields 11 and 11', this representation being by way of example displayed entirely or in part on visualization means 9 and 10.

In accordance with a first characteristic of the invention, the visible representation of a sheet 2, on the one hand of the edition layout 1 (several sheets 2) or of all of this latter, is produced in a corresponding visualization means 9 by use of a file 12 produced and if desired refreshed at regular intervals and/or under the action of an intervener, from corresponding information from the database 8 and adapted to be interpreted by said visualization means 9, all modification of said visual representation being automatically reflected in said file 12, then in said database 8, substantially in real time or in a differentiated manner.

As a modification, it can also be provided that the visible representation of the means 9 will be produced by transcoding 13 the corresponding information of the database 8, any modification of said visible representation being reflected automatically, and preferably in real time, directed into said database 8 by means of a suitable transcoder 13 (see FIG. 3). This transcoder 13 translates the information contained in the field of the database 8 into visible information in the form of screen pages individualization means 9, and conversely.

In accordance with a second characteristic of the invention, constituting an alternative or an addition to the first characteristic mentioned above, part or all of a visible representation of one or several sheets 2 of the edition layout 1 is produced in at least one visualization means 10 associated with the database 8 and using in view of this display directly the corresponding information from said database 8, all modification of said visible representation being reflected automatically and in real time as a corresponding modification of the information in question stored in the database 8, and vice versa.

According to a preferred embodiment of the invention, permitting a sharing of the visible representation between several users and simultaneous intervention of several interveners among the users on this representation, the process can provide displaying a same visible representation on at least two visualization means 10 in the form of graphic interfaces, interconnected and to the database 8 by a suitable network 17 and each associated with a control interface 16 adapted to permit modifying the visible representation, the display of said visible representation being, if desired, shortened in certain of the visualization means 10 and the possibilities of modification being, if desired, limited or absent in one or several control interfaces 16, as a function of the quality of the user in question and of the authorizations possessed by this latter.

As can be seen symbolically from FIG. 3 of the accompanying drawings, the visualization means 10 could also permit displaying, as an alternative to one or several sheets 2, or in superposition, data or information directly from the field 11, the display of these data or information being adapted to be different (hidden or shortened information) as a function of the quality of the authorizations of the user of the visualization means 10 in question.

According to an advantageous modified embodiment of the invention, also shown in FIG. 3, the process can consist in displaying a same visible representation on at least two different visualization means 9 and 10, of which at least one 9 interprets a file 12 produced from information from the database 8 or is connected to a suitable transcoder 13 associated with or integrated into said base 8 and of which at least one other 10, in the form of a graphic interface, directly exploits the information from the database 8, a modification of said visual representation taking place on a visualization means 9, 10 being automatically and substantially in real time reflected in the other visualization means 10, 9.

Of course, the display of the visual representation of the current condition of the layout 1 or of the portion of the layout 1 (one or several sheets 2) can take place on different visualization means 9 and 10 simultaneously or in a different manner. A simultaneous display on different means 9, on different means 10 or on different means 9 and 10 will permit several interveners to modify the visual representation, this modification being simultaneously subjected to other interveners, and/or to those who decide and/or instruct.

So as to take account of the consequences of the modification of an element on one or several other elements, or to reflect automatically the modifications concerning a given element of one or several elements connected or not to said given element, the process can advantageously consist, for a given edition layout 1, in producing or using an automatic control of a relational, structural, spatial and/or dimensional nature, between at least two elements 3, 3a, 4, 4a; 3', 4' of a same sheet 2 or of at least two sheets 2, 2' different from this layout 1, said automatic control being preferably subject to predefined rules and to taking in account graphic criteria.

These rules could for example depend on the nature of the document to be edited, on standards of presentation imposed or on the design selected for the sheets 2.

As to the criteria adapted to be taken into account, there could particularly be cited the impact criteria (hierarchical position that a visual group should take), positional criteria (force of one space relative to another) or the like.

Preferably, it can be provided to ensure an automatic control in real time and reciprocally, between all the elements 3, 4, 3a, 4a, 3', 4' of all the sheets 2, 2' constituting the edition layout 1.

The process consists preferably also in defining in each sheet 2, 2' at least one content 6, 6a, 6' in which is contained an element 3, 4, 3a, 4a; 3', 4' or a group of elements 3, 4, 3a, 4a; 3', 4', the contents 6, 6a; 6' of a same sheet 2, 2' or of at least two different sheets 2 and 2' being automatically controlled between themselves.

The construction of an edition layout 1 begins with a first operative phase of creation, which is generally followed by one or several phases of modification under the influence of different interveners, these modifications being adapted to constitute corrections, touching up, display of the elements or their arrangement, additions, replacements, rearrangements or the like.

In the scope of the first phase of creation, the process can consist, for a first construction of a given edition layout 1, in carrying out the following operations:

a) assigning to all or a portion of the elements 3, 4, 3a, 4a; 3', 4' of the database 8 parameters permitting ensuring an automatic and/or manual selection.

b) selecting, in the database 8, by means of automatic and/or manual means, elements 3, 4, 3a, 4a; 3', 4' adapted to enter into the composition of a sheet 2, 2' of the layout 1;

c) selecting and/or defining a design 5 corresponding to said sheet 2, 2';

d) selecting the order of implantation and the locations of said elements 3, 4, 3a, 4a; 3', 4' on said sheet 2, 2';

e) repeating operations b) to d) for each sheet 2, 2' f) ensuring an edition of at least one sheet 2, 2', of a portion of the layout (1) or of the entire layout (1), on the visualization means 9, 10 or the like.

The same operations are repeated for all the other sheets of layout 1, with other visual elements.

Thus, the process consists at the outset in selecting a certain number of elements adapted to figure in a sheet 2, 21.

In this connection, it should be noted that such an element 3, 4 can in fact be defined by an image block 3 corresponding to the representation of an image and in which can be ensured such a representation (for example a photograph or a drawing).

Such an element 3, 4 can again be defined by a text block 4 corresponding to the representation of a text and in which can be provided such a representation.

Moreover, the process according to the invention can provide a program and a modification, not only of a design 5 for each sheet of the layout, but also of the general structure of this latter, as well as components of each sheet.

To this end, the fields comprise, for a given edition layout 1, information as to the parameters of the arrangement, the presentation, the disposition and the structure of the visible elements 3 4, 3a, 4a; 3', 41, of the sheets 2, 2' and of said layout 1 are adapted to be programmed and modified by a suitable control and programming interface 14 associated with the database 8, said fields being hierarchically structured as to the respective parametrage field of the edition layout 1 as a whole, of each sheet 2, 2', or of the groups of elements 3, 4, 3a, 4a; 3', 4' of each sheet 2, 2', of the element or elements of each group and of the content of each element.

In the case of modification of a parametrage by said interface 14, this modification will thus simultaneously affect all the layout 1, all the sheets, all the contents, all the elements and all the contents of the elements.

The visualization means 9 could also comprise an associated control interface 15. Moreover, all modifications carried out in the visual representation present on said means 9, or if desired only the modifications affecting the visual elements, certain of these latter or of their contents, will be signaled in the database and will require validation therein to be effective and recorded, each modification affecting only the field or the portion of the field effectively concerned by this latter.

Moreover, the process can also provide that all modification can be annulled (returned to the condition before modification).

So as to illustrate the present invention, reference will be made in what follows of the description, to an example of an edition layout 1 (shown partially in FIG. 1) corresponding to a catalog for the presentation of bottles of wine constituting a non-limiting example of application of the present invention).

In such a case, an image block 3 can be constituted by the representation of a bottle or a group of bottles of wine whilst a text block 4 can be constituted by information relative to this bottle or these bottles and corresponding to said representation. Thus, such information can for example relate to the nature, the providence, the vintage of the wine contained in such a bottle, to the handling of these bottles, to the available quantity, the price, etc.

Thus, such visual elements (image block 3, text block 4) have at the outset been recorded in a database by a suitable protocol and, during the construction of a layout 1, these elements 3, 4 are selected from said database, this by means of manual and/or automatic means.

In this connection and to do this, the process according to the invention can further consist in assigning to all or a portion of the elements 3, 4 of said database parameters permitting ensuring automatic and/or manual selection thereof.

Thus, it is possible to define such selection parameters as being for example the quantity of bottles in stock, the quantity of bottles adapted to be delivered by the producer, the profit margin per bottle or per carton of bottles, the trademark, the provenance of the wine, the grape variety, the quantity of bottles sold in the preceding years, the returns accepted by the producer, the ratio of quality/price of a product, etc.

Such an assignment provides that the process according to the invention constitutes a tool to aid in the automatic and/or manual decision for the production of a layout 1 as a function of certain criteria (parameters) that are pre-established. It is obvious that the process can further provide a crossed selection of several parameters for refined production of such a layout 1.

To this end, it will be noted that the process can advantageously be designed such that, in the course of the process of creation of such a layout 1, there will be provided automatically a certain number of selection parameters.

Another characteristic of the process consists in that the selective elements 3, 4 are adapted to figure in at least one sheet 2, 2' of the layout 1.

To do this, the process consists in establishing a design 5 corresponding to such a sheet 2 and within which the elements 3, 4 will be included.

So as to establish such a design 5, the process according to the invention consists in selecting (particularly from a database, for example that containing the elements 3, 4 mentioned above) and/or in defining (particularly for the construction of all pieces) a model 5 corresponding to such a sheet 2.

Figure 2:
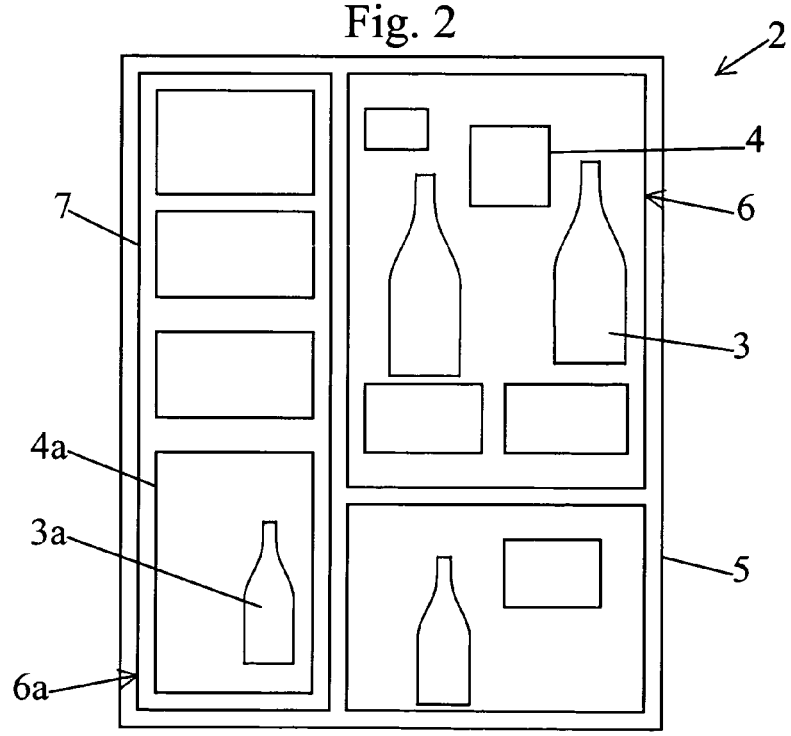
FIG. 2 is a schematic detailed view of a sheet shown in FIG. 1.

To this end and as shown in FIG. 2, such a design 5 of a sheet 2 comprises at least one container 6, 6a adapted to contain at least one element 3, 4; 3a, 4a of the type mentioned above, this for the visualization, in the position occupied by this container 6, of said elements 3, 4; 3a, 4a on the one hand, on the sheet 2 of the layout 1 and, on the other hand, on the printed document based on this layout 1.

It will be noted that such a container 6, 6a can be recorded in a memory (particularly in a database 8, more particularly the one in which are recorded said elements 3, 4) and can be in the form of a frame 7 on said sheet 2.

It is more particularly with such a sheet 2 that are associated at least one such container 6, 6a as well as at least one element 3, 4; 3a, 4a contained in such a container 6; 6a, such an element 3, 4 being moreover also associated with at least one such container 6.

According to another characteristic of the invention, there can be recorded, in a memory, a certain number of designs of containers 6, 6a, 6' with which can be associated parameters permitting the assurance of an automatic and/or manual selection thereof.

Thus, it will be noted that such a selection can take place automatically, particularly as to function of a selection previously effected, of the elements 3, 4 and/or of the parameters of these elements 3, 4. The process can thus consist in that it is subjected to an automatic validation of the selection so as, as the case may be, to provide another selection.

Of course, the process can also permit a manual selection of such a container 6 during construction of an edition layout 1.

After having established the design 5 of at least one sheet 2, 2', the process consists in implanting the selected elements 3, 4; 3a, 4a; 3', 4' in at least one container 6, 6a; 6'.

Thus, when these elements 3, 4 are implanted, the process consists in selecting the order of implantation of these elements 3, 4 on said sheet 2 and particularly relative to one or several containers 6, 6a.

To this end, it will be noted that, according to another characteristic of the invention, all or a portion of these elements 3, 4 can be characterized by an identification associated with such an element 3, 4 (particularly in a database in which said identification and the corresponding element 3, 4 are recorded), such an identification being more particularly characterized by the order of implantation of this element 3, 4 on the sheet 2.

Finally, the process consists in that, during or after the implantation of these different elements 3, 4 in said sheet 2, an editing of the sheet 2 is performed. Such an editing is carried out more particularly on a screen, particularly that of a computer device adapted to manage and guide the process according to the invention.

According to another characteristic of the present invention, there is associated with a sheet 2 at least one container 6; 6a as well as at least one element 3, 4; 3a, 4a contained in such a container 6, 6a and there is, if desired, ensured an automatic control as to position and/or size of the element or elements 3, 4; 3a, 4a in at least one container 6; 6a with one or several other elements 4, 3; 4a, 3a of this container 6 or of at least one other container 6a.

To this end, it should be noted that a particular embodiment of the invention consists in that there is ensured an automatic control as to position and/or size of an element 3 (for example constituted by the image of a bottle) of a container 6 and to another element 4 (for example constituted by the price of this bottle) of this container 6.

Thus, such an automatic control can be designed so that when one acts on an element 3 of the content of a container 6, there follows an automatic control as to position and/or size of the other element or elements 4 of this or these other containers 6, 6a.

Such an automatic control can again be designed such that when one acts on the size of a container 6 which automatically controls an element 3 of the content of this container 6, there results an automatic control as to position and/or size of the other element or elements 4 of this container 6.

According to another characteristic of the invention, one assures, if desired, an automatic control as to position and/or size of all or a portion of the elements 3, 4 and/or of all or a portion of the containers 6, 6a of a sheet 2 relative to all or a portion of the elements 3', 41 and/or all or a portion of the containers 6' of another sheet 2' of the layout 1.

Such an embodiment preferably permits, when acting on an element 3, 4 and/or on a container 6 of a sheet 2 such that there is produced automatically an automatic control as to size and/or position of an element 3', 4' and/or of a container 6' of the other sheet 2'.

In this connection, it will be noted that such an embodiment permits for example when an element 3 of a first sheet 2 is omitted or modified, ensuring a movement or modification of an element 3', 4' of a second sheet 2', particularly by ensuring its transfer to the first sheet 2.

An additional characteristic of the process consists in that one authorizes the selection of the automatic control as to size and/or position, of at least one element 3, 4 contained in at least one container 6 relative to at least one other element 4, 3 (particularly contained in the container 6 or in another container 6a) and/or relative to at least one container 6, 6a (particularly the container 6 in which said automatically controlled element is contained, or else another container 6a).

Such characteristic permits or not the activation of such an automatic control.

Again, another characteristic relates to the fact that the process consists in that one, if desirous, ensures an automatic control of the content of all or a portion of the elements 3, 4; 3a, 4a of at least one container 6; 6a; 6', to the content of all or a portion of the other elements 4, 3; 4a, 3a of this container 6 or of at least one other container 6a; 6' figuring particularly in a same sheet 2 or another sheet 2'.

Such an embodiment permits, when one proceeds to modification of the content of an element 3, 4 of a container 6, to record automatically this modification in another element 4, 3 of the container 6 or of another container 6a, 6'.

By way of example, such an embodiment permits placing in several elements 4, 4a of different containers 6, 6a information concerning the nature of the handling of the bottles, a promotional offer or else a legal notice (for example an advertisement relative to the risks connected with abusive consumption of alcohol).

An additional characteristic of the process consists in that one permits the selection of the automatic control of the content of at least one element 3, 4 contained in at least one container 6 relative to at least one other element 4, 3 (particularly contained in this container 6 or in another container 6a) and/or relative to at least one container 6, 6a (particularly the container 6 in which said automatically controlled element is contained, or else another container 6a).

Such a characteristic permits or not the activation of such an automatic control.

According to another characteristic of the invention, the process consists in that there is defined a hierarchy between all or a portion of the elements 3, 4; 3a, 4a; 3', 4' of one or several containers 6; 6a; 6' of one or several sheets 2; 2' and one ensures an automatic control of the hierarchy of all or a portion of these elements among themselves, 4; 3a, 4a; 3', 4' such that when one acts on such an element 3, 4, there follows a modification of the hierarchical order of the other elements 3a, 4a; 3', 4'.

A particular embodiment consists in ensuring only the hierarchical arrangement of the image blocks 3, 3a, 3'. To this end, it will be noted that, because of the association (even the automatic control) of the elements 3, 4 among each other (more particularly of a block image 3 and its corresponding block text or texts 4), all action on such a block image 3 gives rise, on the one hand, to a modification of the hierarchical order of the other elements and, on the other hand, an action on the text block or blocks 4 corresponding to this image block 3.

By way of example of such a hierarchical arrangement, there can be considered a sheet showing ten bottles, each of these ten bottles being characterized, on the one hand, by an image block 3 in which such a bottle is represented and, on the other hand, by at least one text block 4 connected to said image block 3, and in which is arranged information relative to this bottle (for example the provenance, the price, the handling . . . ). Said hierarchical arrangement consists thus in attributing a hierarchical order to each of these bottles (particularly, to each of the image blocks 3 corresponding to such a bottle, namely to each of the elements 3, 4 corresponding to such a bottle) such that, when one proceeds to the deletion of a bottle, for example the bottle No. 8 (image block 3 and text block 4 relating thereto), there is automatically produced a modification of the hierarchy of the former bottles Nos. 9 and 10 (particularly the image blocks, namely again the text blocks relating to these former bottles) which become, respectively, the new bottles Nos. 8 and 9, this through the automatic control of the hierarchical arrangement.

It will be noted that a sheet 2 is comprised by one or several containers 6, 6a, of which one can be constituted by a representation (image block 3) of at least one bottle if desired accompanied by at least one commentary (text block 4) relating to this or these bottles whilst another container 6a can comprise more exhaustive information (text block 4a) relating to this or these bottles. The present process can thus be designed such that in case of the deletion of a bottle from a container 6, there is produced a deletion of the text block 4a corresponding to this bottle in the other container 6a as well as a new hierarchical arrangement of the elements contained in each of these containers 6, 6a.

It should be noted that the process according to the invention again consists, when one proceeds to the addition of a bottle (image block 3 accompanied by at least one text block 4), in attributing automatically an order of hierarchical arrangement to this new bottle (more particularly to the corresponding elements) and consists in ensuring an automatic control of the hierarchical arrangement of the other bottles from which ultimately results an offset of the order of hierarchical arrangement of these latter.

Moreover, said process can also be designed so as to permit the displacement of a bottle (particularly an image block 3 corresponding to this bottle) within a same container 6, or from one container 6 to another container 6a, particularly from one sheet 2 to another sheet 2'.

The process can thus consist in ensuring an automatic control of the hierarchical arrangement of other bottles (of the container or containers 6, 6a) by assuring an offset of the order of hierarchical arrangement of these latter.

However, and according to another embodiment, said process can again permit interchanging two bottles and/or two elements (particularly relating to a same bottle or to two different bottles) and thus consists again in interchanging the order of hierarchical arrangement of these bottles and/or of these elements.

As noted above, there is associated an identification with all or a part of the elements 3, 4 (namely again with all or a portion of the containers 6 and/or the designs 5 on the sheet 2 and/or of the frames 7) of at least one database. Moreover, there is ensured as indicated a connection between the different identifications of these elements 3, 4 (namely of these containers 6 and/or designs 5 and/or frames 7).

It is more particularly by such connections that the automatic control or controls between elements and sheets and/or the hierarchical arrangements described above, are made possible.

According to another characteristic of the invention, there is ensured a memorization in at least one database 8, of all or a portion of said elements, 3, 4, namely again of all or a portion of the containers 6, designs 5 and/or frames 7 of all or a portion of these sheets 2, 2' of an edition layout 1.

The loading of the database 8 by memorization of such information and data could for example be carried out according to the process described in European patent application No. 1 285 356 or in U.S. patent application Ser. No. 10/276,596.

Moreover, and according to a preferred embodiment of the invention, the process consists in that there is ensured a memorization of all or a portion of the modifications and/or of the history of the modifications brought to such an element (namely such container, design and/or frame).

Moreover, said process can provide the memorization, in a database, of all or a portion of the stages of development of a sheet 2. Thus, such a memorization can be carried out by proceeding to the memorization of all or a portion of the modifications and/or of the history of the modifications given to such an element (namely to such a container, design and/or frame).

Moreover, there is provided by this fact a memorization, in a database 8, on the one hand, of an identification such as mentioned above and, on the other hand, and in relation with its identification, such an element (namely again such a container, design and/or frame).

However, and according to a preferred embodiment of the invention, there can again be ensured a memorization, within at least one database, on the one hand of such an identification and, on the other hand and in relation to this identification, all or a part of the modifications and/or of the history of the modifications given to a sheet 2 and, more particularly to an element (namely to the container, to the design and/or to the frame) with which is associated this identification, preferably to each element 3, 4 and/or sheet 2.

Such an embodiment permits memorizing all or a portion of the stages of the evolution of a sheet 2 and permits on the one hand a consultation of said modifications and/or of the history of these latter and, on the other hand, a reminder of a prior modification, particularly to take into account the construction of a layout 1, for example instead of and in place of a subsequent modification.

Still another characteristic of the invention consists in that the visualization is ensured by means of suitable means, of all modifications and/or corrections given to a sheet 2.

In this connection, it will be noted that such visualization means can be constituted by a highlighting of a portion of at least one of the modifications and/or corrections which have been given to a sheet 2, particularly a highlighting of a portion of at least one image block 3, of a text block 4, of a container 6 or the like having been modified or corrected.

Thus, a preferred embodiment of the invention consists in ensuring such a highlighting with the help of different colors, each of these colors being adapted to be characteristic of the origin (internal intervention, external intervention . . . ), of the nature (addition, deletion . . . ), or the like of such a modification and/or correction.

Thus, by ensuring the visualization, for example on a screen, of a sheet 2, it is immediately possible to see whether a modification/correction has been give to such a sheet 2 and to determine the origin and nature of it or the like.

According to another characteristic of the invention, the process consists in ensuring the alignment, by means of an intra network (internal) and/or extra network (external) and in real time, of at least one sheet 2.

Such a characteristic permits on the one hand and by means of visualization of at least one such sheet 2, a consultation in, real time of the condition of development of such a sheet 2 as well as if desired of all the edition layout 1. Such an embodiment permits ensuring supervision of the process of construction of such a layout 1, by one or several persons located at distant points.

Such a characteristic permits on the other hand access to such a sheet 2, particularly for an operator in charge of working on the latter.

This permits for example a designer of the layout 1 to give a modification and/or a correction to at least one sheet 2, to a person in charge of the supervision of the process of construction of a layout 1 to validate or not such a modification/correction, etc., these persons being as the case may be very remote from each other.

Another possibility consists in that a supplier (particularly of bottles) can also have access to such a sheet 2 or to visual elements 3, 4 in such a sheet 2. Such access can permit such a supplier to give supplemental information, a modification of information figuring either in such a visualized element 3, 4 in a sheet 2, or in a parameter for selection mentioned above and associated with such an element (return, available quantity . . . ). This direct access advantageously permits avoiding an error in transcription of such information.

In this connection, it should be noted that the access (for visualization and/or for any other intervention) to such a layout 1, to such a sheet 2 or to certain elements 3, 4 or to certain parameters of selection of these elements 3, 4, can be controlled by the process according to the invention. Thus, this process consists in that there is ensured the emplacement of filters permitting or not access to certain constituents (image blocks 3, text 4, containers 6 or sheet 2) of a layout 1 or to certain information connected with this latter (selection parameters), this as a function of the nature of the intervener (e.g., project chief, layout artist, supplier, client).

Moreover, it will be noted that such an edition layout 1 is usually sent by software or placed on the page by which this layout 1 can be subjected to a certain number of modifications as desired, on the one hand, to re-read (particularly for their validation or not) and, on the other hand, to add to this layout 1.

Also, and according to another characteristic of the present invention, the process consists in that, after or during construction of such a layout 1, the content of at least one page 2 is placed in the form of a file, adapted to be interpreted by the software or to be enpaged, and exported toward this latter. This process moreover consists in that when a modification is given to said file 12 via said software installed at a corresponding work station 9, 15, said modification is reported automatically to the content of said at least one sheet 2 corresponding to said file.

In this connection, it will be noted that the content of such a sheet 2 is in the form of a file 12 interpretable by the software, this by means of transformation means, particularly of the software type.

Thus, a preferred embodiment concerns the fact that such an embodiment consists in that there is associated with each constituent (image block 3, text block 4, namely again container 6, design 5 and/or frame 7, particularly memorized in at least one database) of the content of such a sheet 2, at least one marker adapted to be recognized by said software.

Also, when a modification of a constituent is made in the file, this modification takes place between two markers and it is reported automatically (in the framework of the process according to the invention) in the constituent, associated with at least one of these markers, and figuring in at least one database containing the constituents of the sheets 2 of the layout 1.

To do this, the process can again consist in that there is detected, in a modified file (particularly derived from the software), at least one modification given to a constituent associated with at least one marker and in that there is reported automatically this modification in the constituent memorized in said database. Such an embodiment permits the display (in a database) only of the constituents modified by means of the software, this without erasing or modifying (in the database) all of the constituents, corresponding to the content of at least one sheet 2, and given to a modified file (even if certain or even most of these constituents have not been modified).

Moreover, it will be noted that such a manner of proceeding permits advantageously preserving the characteristics of the edition layout 1, particularly as to the connections established between the different elements and/or constituents, the order of hierarchical arrangement, the history, the parametrage, etc.

As a modification, it can also be provided to use a transcoder 13 permitting a synchronization substantially in real time between the content of the database 8 and the visual representation present on the means 9.

According to another characteristic, the process according to the present invention is adapted to be managed by software adapted to be used by means of computer processing means, particularly constituted by a computer or the like.

The process could also comprise additional functions of the automatic production type of new assemblies of text blocks 4 and image blocks 3; re-dimensioning or automatic movement or not of such blocks as a function of addition, omission, modification; replacement, addition or automatic deletion of targets or computer supplements (indication of promotions, novelties, presents, refunds, etc.) or the like.

The present invention also has for its object a system for the practice of the process described above.

Such a system is principally constituted, as shown in FIG. 3 of the accompanying drawings, by a database 8 storing information relative to the structure, arrangement and content of an edition layout 1 in the identified fields interconnected by corresponding connections, and by at least one visualization means 9, 10 adapted to display a visual representation according, to the nature of at least one portion of said edition layout comprised by at least one sheet 2 in which is included at least one visual element 3, 4. This system is characterized in that said at least one visualization means 9, 10 carries out a dynamic and interactive display permitting a modification, by an intervener or user, of the visual representation of the layout 1 or portion of a layout 1 and in that it comprises an automatic control between said at least one visualization means 9, 10 and the database 8 such that any modification of the layout 1 in question could take place in one or more of its visual representations and is automatically transposed to the database 8 and that all modification of the layout 1 in question taking place in the database 8 is automatically displayed in said at least one visual representation.

The system will of course include suitable hardware and software for the practice of the different operations described above with respect to the process according to the invention (processing unit, memory, control and programming interface), and in particular a control interface 15, 16 associated with each visualization means 9, 10 and a control and programming interface 14 associated with the database 8.

The principal advantage of the invention consists in the provision of reciprocal automatic control, and preferably in real time (synchronization), between the database 8 storing the information of a given layout 1 and the visualization means 9, 10 displaying a representation of said layout 1.

A second important advantage of the invention consists in an automatic control between certain ones of different elements 3, 4 constituting the visual information presented on the sheets 2 and/or of certain containers, this or these automatic controls being adapted to be present in different forms.

Additional advantages of the present invention consist in that, on the one hand, from elements figuring in a database and by the selection of these latter, and on the other hand, from a design of a layout sheet, there is ensured the production and editing of such a sheet by ensuring the presence, within these latter, of said elements, this is an automated way.

Another advantage of the present invention consists in that there is defined, in a sheet, containers receiving elements and that these elements and/or the containers for these elements can be change in size and/or position, such that when it is a matter of the size of a container which is determined by an element of its content, there follows an automatic control in position and/or size of said element of such a container.

According to another advantage, there is defined a hierarchy between the elements of one or several containers and there is ensured an automatic control of the hierarchical arrangement of these elements between each other such that when acting on such an element, there follows a modification of the hierarchical order of the other elements.

Of course, the invention is not limited to the embodiment described and shown in the accompanying drawings. Modifications remain possible, particularly as to the construction of the various elements or by substitution of technical equivalents, without thereby departing from the scope of protection of the invention.

The invention claimed is:

1. A process for constructing a layout of an edition of a document, comprised the steps of:
    storing in a database information relative to structure, arrangement and content of a layout of plural sheets of a document to be printed, the sheets including plural visual elements, the information being stored in the database in fields that are interconnected by connections and including first fields that store a description of a content of the visual elements and second fields that store a description of an arrangement and presentation of the visual elements and a structure of the layout;
    displaying a visual representation of the layout on a first display based on the information in the database;
    displaying the visual representation of the layout on a second display separate from the first display, the first and second displays being connected to the database by a network;
    automatically controlling in real time spatial relationships between the visual elements on the sheets based on predefined rules and graphic criteria so that a modification of one of the visual elements affects the other visual elements on the sheets, the predefined rules being based on at least one of a nature of the document, presentation standards, and a design of the sheets, and the graphic criteria taking into account at least one of hierarchical position of the visual elements and a visual impact of the visual elements relative to one another;
    automatically controlling the first and second displays and the database so that all modifications of the layout made on the first display and on the second display are automatically made in the database and on the other of the first and second displays in real time and so that all modifications of the layout made in the database are automatically displayed on the first and second displays in real time; and
    modifying the visual representation of the layout in one of the first display, the second display and the database by modifying at least one of the description of the content of at least one visual element, the arrangement and presentation of the visual elements, and the structure of the layout.

2. The process according to claim 1, further comprising a step of defining plural containers that each contains at least one of the visual elements, each of the containers of a same layout being automatically controlled between each other with respect to position and size.

3. The process according to claim 1, further comprising the steps of:
   a) associating, in the database, parameters with the visual elements permitting automatic and/or manual selection of the visual elements;
   b) selecting from the database ones of the visual elements adapted to enter into the layout;
   c) selecting and/or defining a design for the layout so as to create the information for the database;
   d) selecting an order of implantation and locations of the selected visual elements on the layout; and
   e) repeating steps a)-d) for each sheet of the document.

4. The process according to claim 1, further comprising a step of defining a hierarchy between the visual elements and automatically controlling a hierarchical arrangement among the visual elements so that a modification of one of the visual elements is automatically reflected in a modification of the hierarchical arrangement of the other visual elements.

5. The process according to claim 1, further comprising a step of storing in the database identifications associated with each of the visual elements and a history of modifications of each of the visual element accessible by their identifications.

6. The process according to claim 1, further comprising a step of providing filters that control access to the layout as a function of an authorization of a user.

7. The process according to claim 1, wherein the step of controlling the spatial relationships includes automatically and simultaneously controlling the dimensions and positions of all the visual elements on all the sheets.

8. The process according to claim 1, further comprising the step of providing an interface that programs the information, and, through the interface, modifying the program for the information to simultaneously affect all the visual elements on all the sheets.

9. The process according to claim 1, wherein a same one of the visual elements appears on plural different ones of the sheets and wherein the step of modifying the visual representation of the layout includes modifying all of the same visual element on the different sheets by modifying only one of these same visual elements on one of the sheets.

* * * * *